J. F. GORDON.
Grain Binder.

No. 77,878.

3 Sheets—Sheet 1.

Patented May 12, 1868.

Witnesses:
N. H. Sherburne
Chris. Boyle

Inventor:
James F. Gordon

J. F. GORDON.
Grain Binder.

No. 77,878.

3 Sheets—Sheet 2.

Patented May 12, 1868.

Witnesses:

Inventor:

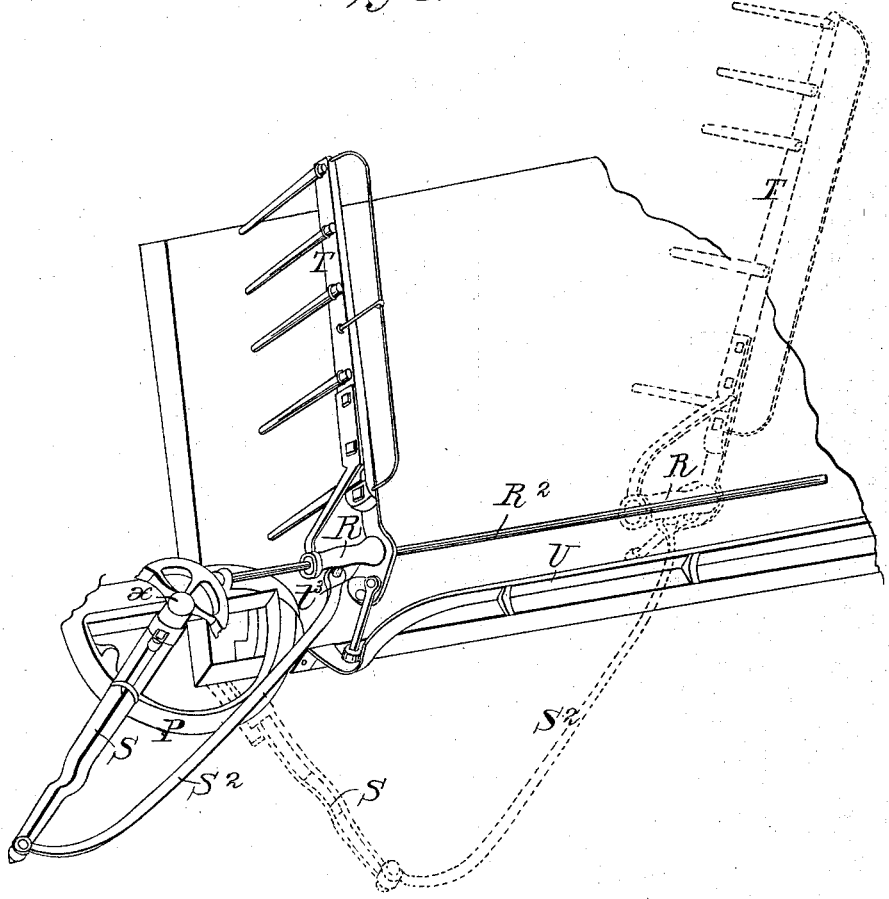

UNITED STATES PATENT OFFICE.

JAMES F. GORDON, OF KALAMAZOO, MICHIGAN.

IMPROVEMENT IN GRAIN-BINDERS.

Specification forming part of Letters Patent No. 77,878, dated May 12, 1869.

*To all whom it may concern:*

Be it known that I, JAMES F. GORDON, of Kalamazoo, in the county of Kalamazoo and State of Michigan, have invented certain new and useful Improvements in Grain-Harvesters; and I do hereby declare the following to be a full and exact description thereof, reference being had to the accompanying drawings, and to the letters of reference marked thereon, making a part of this specification.

My invention relates to certain improvements in that class of harvesters by which the grain, as it is cut, is bound by the operation of the machine.

In the machine the subject of this invention the rake makes its effective sweep across the platform from the grain side of the same toward the main frame. The grain thus gaveled or bundled at the inner edge of the platform is held by the rake, which has an interval of rest for that purpose, against a wire, which is supplied from an elevated reel, and held by grasping devices at a point below the gavel, and which is made to completely encircle the gavel by the descent of a binding-arm, and ultimately cut and twisted, so as to firmly and securely bind the grain into a sheaf.

The nature of my improvement consists, first, in the provision of the binding-arm, which carries the wire around the sheaf, and which, in conjunction with the other devices directly concerned in the binding operation, is made adjustable, so as to bring the wire in position to bind at the center of the gavel, thus suiting the apparatus to grain of any length; second, in novel devices for holding, twisting, and cutting the wire, as will be hereinafter more fully explained; third, in the manner of connecting the twisting device with the rake, so that while the former derives its motion from the latter the twisting-hook remains at rest as the rake makes the stroke which gathers the grain, said hook being thus permitted to maintain the position which enables it, when rotated, to catch the wire after the same has been passed around the gavel by the descent of the binding-arm, as hereinafter explained; fourth, in the means for operating the rake, whereby the same is brought to rest as often as it completes its effective stroke, in order that it may serve as an adjunct of the binding device in confining the grain within the path traversed by the binding-arm until the latter has completed its descent, and so encircled the gavel with wire.

Figure 1:
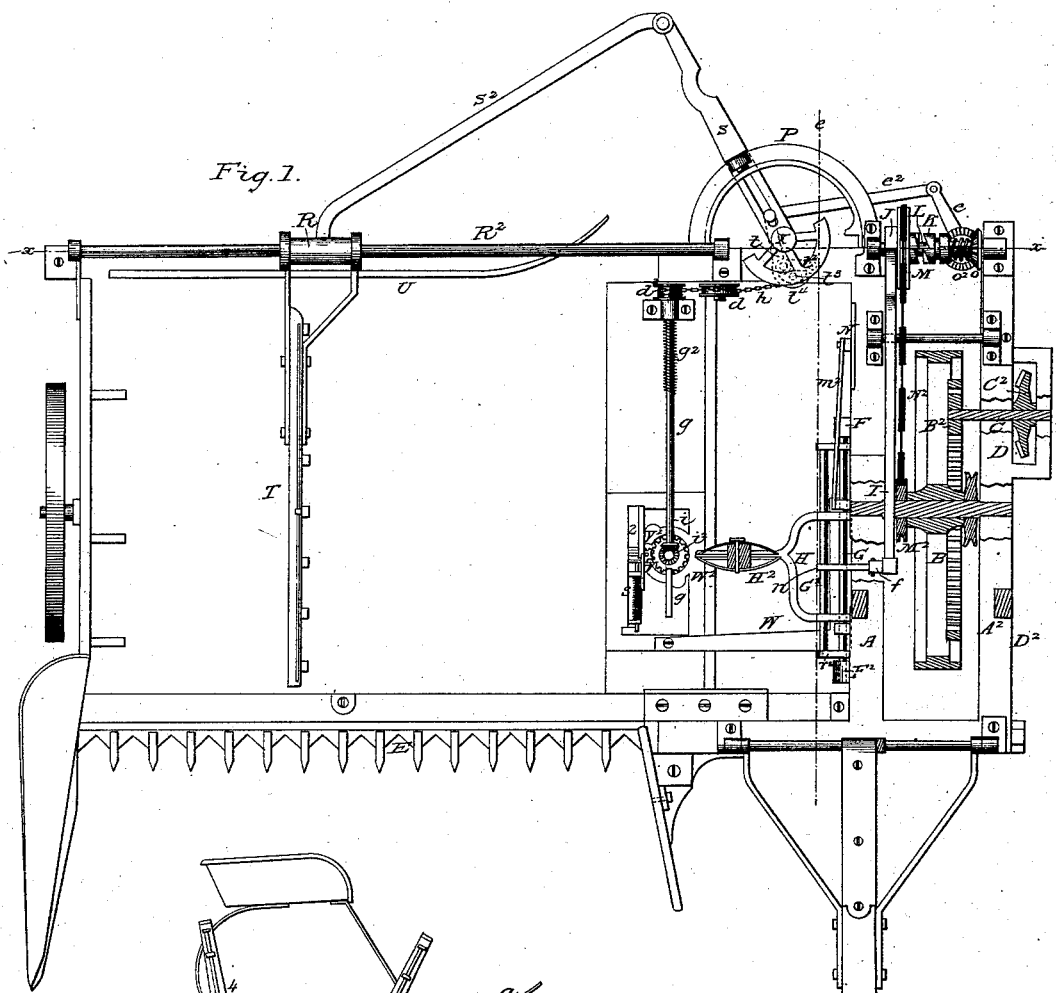
Figure 2:
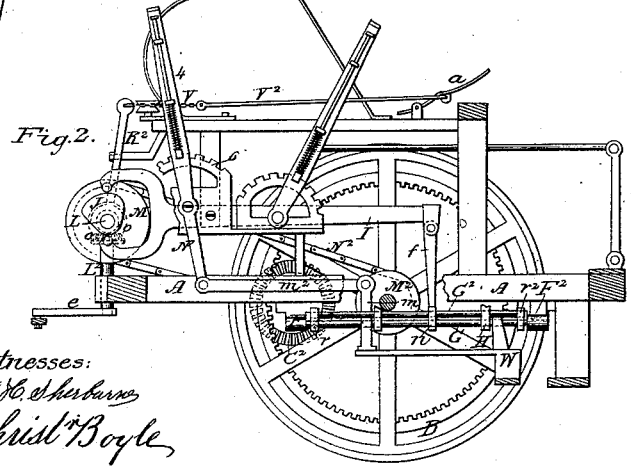
Figure 3:
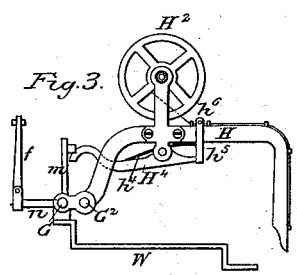
Figure 4:
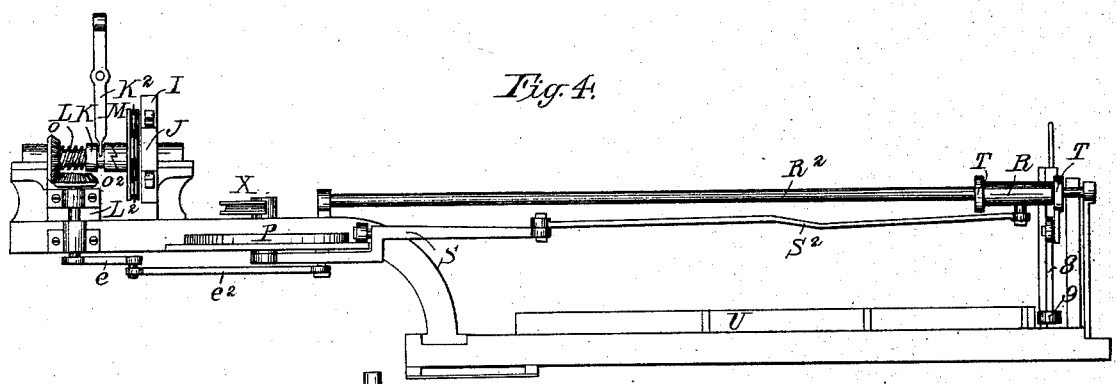
Figures 5, 6:
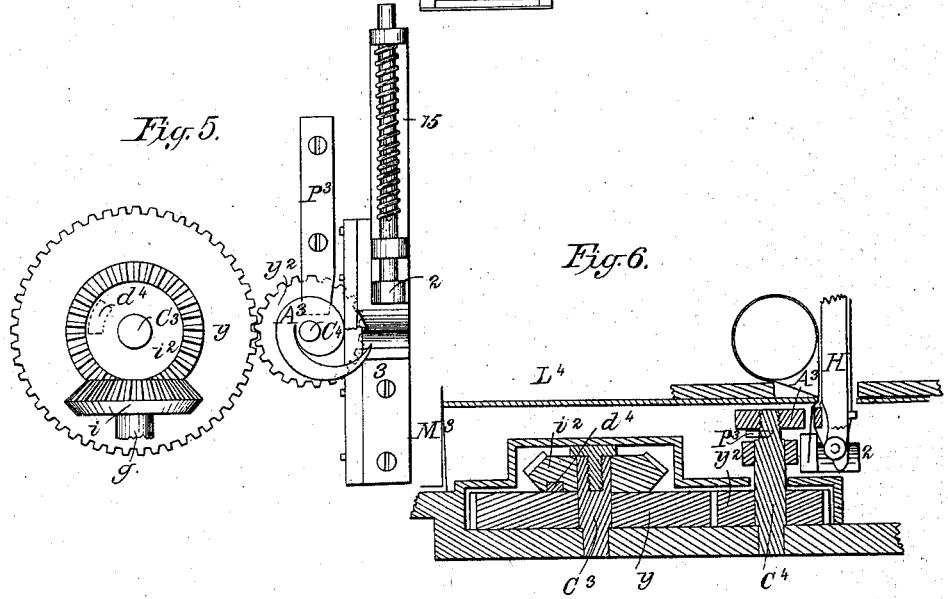
Figure 7:
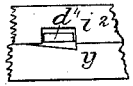

Figure 1 is a plan or top view of the machine, partly in section, the plane of section being below the seat and reel, which consequently are not seen. Fig. 2 is a vertical longitudinal section of the same, the plane of section being indicated by the line $e\ e$, Fig. 1. Fig. 3 is a side elevation of the binding-arm and its appendages detached. Fig. 4 is a vertical transverse section on the line $x\ x$, looking forward. Fig. 5 is a plan of the parts and the adjuncts of the same which cut and twist the wire after it has been made to encircle the gavel. Fig. 6 is a vertical transverse section through the parts shown in Fig. 5, a portion of the binding-arm being here introduced to illustrate the twisting operation. Fig. 7 is a sectional view of a portion of the main gear-wheel and the miter which drives it, pertaining to the twisting apparatus, showing the manner of coupling the wheels under the effective motion, and permitting the independent motion of the miter at other times. Fig. 8 is a detached view showing the operation of the stop-pin $t^3$ in relation to the rake.

Similar letters of reference indicate corresponding parts in the several figures.

To enable others skilled in the art to construct and use my invention, I will proceed to describe the same with reference to the drawings.

A and $A^2$ represent the side pieces of the frame of the machine; B, the ground or carrying wheel, which gears with a pinion, $B^2$, on a transverse horizontal shaft, C. On the opposite end of said shaft is a bevel-wheel, $C^2$, that takes into and gears with a pinion at D on a longitudinal horizontal shaft at $D^2$, which is connected to the sickle E by means of a crank and pitman, which, together with the pinion D and shaft $D^2$, are not shown in the drawings, as these devices form no part of the present invention.

Attached to the side piece, A, of the frame are bearings F and $F^2$, extending downward and receiving a horizontal rock-shaft, G. Attached to said rock-shaft is a second pair of bearings, $r$ and $r^2$, that receive a second shaft, $G^2$. To said shafts G and $G^2$ is attached the binding-arm H, the same extending toward the platform and over the twisting device. Said arm is so fitted to the shafts as to be capable of being moved thereon in the direction of their length. Beneath said shafts G G², and connected to shaft G just outside of the bearings of arm H, is a frame, W, that is also so fitted to the shaft as to be capable of moving thereon longitudinally. Said frame is bent around so as to bring the ends thereof at right angles one with the other. The end extending toward the platform is bolted to the frame-work W², carrying the twisting device and its appurtenances. Said frame W² is held in guides or ways parallel with the shafts carrying the arm H, and is capable of a longitudinal movement—that is to say, a movement parallel with the grain as it lies upon the platform. Attached rigidly to the rear end of frame W is a vertical standard, $m$, that is connected to the lower end of a vertical lever, N, by means of a horizontal rod, $m^2$. Said lever is so arranged as to be capable of an oscillating movement upon its fulcrum, and held at any adjusted angle by means of slide-rod or trigger 4, that takes into notches in the upper edge of segment 6.

It is known that the length of grain varies much, and in order to make a binder operate practically it should be adjustable, so as to always apply the binding-wire to the center of the sheaf; and it is for this purpose that the parts heretofore described are designed.

The adjustment is effected as follows: The driver, by moving or oscillating lever N, which connects with frame W by means of rod $m^2$ and standard $m$, (said frame W being so fitted to shaft G as to come in contact with the bearings of arm H,) gives the binder and twister and their several accessories a longitudinal movement upon the rods G G², which brings them and the wire at any suitable point to bind the sheaf in the center.

Firmly attached to shafts G and G² is a transverse horizontal lever, $n$, that is connected to the forward end of a longitudinal horizontal lever, I, by means of a vertical pitman, $f$, said lever I extending backward to the rear end of the machine, and being fulcrumed near its end upon a shaft, I². The rear end of said arm is provided with rigid jaws, the extremities of which carry friction-rollers that occupy positions above and below and rest against a cam, J, keyed upon a transverse horizontal shaft, L. Loosely fitted upon said shaft, near cam J, is a sprocket-wheel, M, that receives a chain-belt, N², that extends forward and around a like wheel, M², on the shaft of the driving-wheel B. The hub of wheel M is cut away in the form of ratchet-teeth, which engage like teeth cut in the end of clutch K on said shaft L. Said clutch is provided near its center with a circumferential groove that receives the lower forked end of a vertical lever, K², as shown in Fig. 4 on Plate 2, said lever extending upward, and being provided at or near its center with a fulcrum upon which the same may oscillate. The upper end of said lever has attached to it a chain, V, that passes around a pulley at right angles with the lever, and is attached to a horizontal rod, V², that extends forward and is fastened to a treadle, $a$, in front of the driver's seat. The rake derives motion from the shaft L, as will be hereinafter explained.

The object of this mechanism may be stated as follows: Should the grain be sparse, or not sufficiently abundant to supply a gavel as fast as the rake would gather it under the motions at which the parts are normally timed to operate, the driver can readily by forcing treadle $a$ downward throw the rake and binder out of gear, or, in other words, throw clutch K out of the notches in the end of wheel M, thus allowing the rake and binder to remain at rest until the machine has moved a proper distance to gather enough grain to form a suitable-sized gavel. On the outer end of shaft L is a gear-wheel, O, that takes into a like wheel, O², on the upper end of a vertical shaft, L². Attached to the lower end of said shaft is a crank-lever, $e$, that is hinged or jointed to a horizontal pitman, $e^2$. The opposite end of said pitman is provided with a stud that works within a slot cut longitudinally in arm S. Said arm S is hinged or jointed to a second arm, S², that is pivoted to a sliding sleeve, R, on a horizontal guide-rod, R². Said sleeve is so fitted to said guide-rod as to be capable of sliding or moving thereon its entire length. Upon said guide rod R², and at the ends of slide R, is attached the shank of the rake head T, the same being also so fitted to said shaft as to be capable of moving thereon.

Hinged to one of the bearings or shank of the rake is a vertical lever, 8, that is provided at the lower end with a friction-roller, 9. Said lever is so arranged that as rake T is moved forward or toward the binder by means of slide R, said lever will be loose upon its axis, allowing said roller to pass along and outside or in the rear of guide U, (that is bolted to the platform of the machine;) but as the rake recedes or moves backward roller 9 comes in contact with and against the curved portion of guide U, thus throwing said roller to the front side of said guide U, which brings the upper end of lever 8 against a stop-pin, $t^3$, in the shank of the rake, thus raising the same to an oblique vertical position, which allows said rake to move backward over the fallen grain and across the platform. As soon as the rake has passed the entire length of said guide roller 9 of lever 8 passes through the space between the end of the guide U and the grain-board on the outer side of the platform, thus allowing the rake to drop down to a horizontal position, and upon the platform back or outside of the fallen grain.

Attached to the inner end of arm S is a sector, X, to which is made fast a chain, $h$, the said chain extending thence in the direction of the width of the machine and passing over pulley $d$, and thence around a like pulley, $d^2$, on horizontal shaft $g$, to which latter pulley the chain $h$ is made fast.

Said shaft $g$ extends parallel with shafts G and $G^2$, and is provided with a pinion, $i$, that is so fitted to the shaft as to be compelled to always partake of the rotation thereof, but capable of being moved thereon in the direction of its length, to conform to the position of the binding mechanism. The pinion $i$ gears with a like pinion, $i^2$, keyed upon a vertical shaft, $C^3$, that has loosely fitted upon it a gear-wheel, Y, said wheel gearing with a pinion, $Y^2$, on vertical shaft $C^4$, to which is attached the twisting-hook $A^3$.

Attached to frame $W^2$ and parallel with shaft $g$ are clamp-plates 2 and 3, of which the plate 2 is movable, so that as the arm H is forced down its wedge-like extremity finds its way between the same, and so forces them asunder; but as the arm H ascends said clamp-plates are forced together by the action of a spring, 15, or its equivalent, thus holding the end of the wire below the twisting-hook $A^3$.

Attached to the frame-work or lap of the twister is a movable slide, $L^4$, (see Fig. 6,) the same sliding in guides or ways, and being held in proper position by means of a vertical spring, $M^3$. Said slide is so fitted in the platform as to be nearly flush with the upper surface thereof, and is capable of being moved or forced back by the downward movement of said arm H, the resistance thereof being such as to force the wire tight against the inner edge of said arm, thus holding the same while it is being twisted by the rotation of the hook, after the wire has been cut loose from the arm. Pinion $i^2$ of shaft $C^3$ is provided with a cavity or chamber that receives a movable block or self-adjusting key, $d^4$, Figs. 6 and 7. The cavities in the respective wheels are so formed that as pinion $i^2$ is rotated under the receding motion of the rake the block will drop down and take into a like chamber in the upper surface of wheel Y, thus causing the wheels $i^2$ and Y to rotate simultaneously, and thereby putting the twisting-hook in motion; but when the motion of said pinion is reversed said block will rise out of the chamber in wheel Y, by reason of one side of said chamber being oblique, as shown, and allowing said pinion and shaft $g$, carrying the same, to turn backward without moving wheel Y or the twisting-hook.

The shaft $g$ is encircled by a spiral spring, $g^2$, whereby the backward motion of said shaft is produced as chain $h$ is loosened by the forward movement of the rake. That motion of the shaft $g$ which puts the twister $A^3$ in motion is effected by the unwinding of the chain $h$ upon the pulley $d^2$, the proper motion to so unwind the chain being communicated to the sector X by the rake when receding. As the chain must be rewound upon the pulley $d^2$, in order to adapt the shaft to be rotated in the effective direction as often as the rake recedes, the spiral spring $g^2$ is so applied to said shaft as to give it a reverse and, as before explained, ineffective motion as the rake sweeps toward the twister, the effect of which is to wind up the chain $h$ as it is slacked during said motion of the rake.

Bolted to the frame of the twister is a cutter-blade, $P^3$, so arranged as to cut the wire near and below the twisting-hook $A^3$, as said hook makes its first revolution after receiving the wire from arm H.

Hinged to the pivot of pitman $e^2$, working in the slot of arm S, is an arm, $t$, that is provided at its inner end with a circular hook, $t^4$, working around a stop-pin, $t^3$. To said arm $t$ is jointed, at one end, a second arm, $t^2$, whose opposite end is jointed to the main frame. The hook $t^4$, by its engagement with the stationary pin $t^3$, serves, during certain stages of the motion of the rake, to give proper direction to the stud which traverses the slotted arm S; but when the rake reaches the terminus of its motion toward the twister the hook $t^4$ disengages itself from the stop-pin $t^3$, leaving the arms $t$ $t^2$ and pitman $e^2$ in such relative positions that the actuating-stud on pitman $e^2$ is allowed to traverse the slot of arm S without imparting motion to the latter or to the rake until the crank $e$ has completed about one-fourth a revolution, when the continued motion of said crank brings the arms $t$ and $t^2$, together with the hook $t^4$, into proper relative position to impart the receding motion to the rake. This motion of the rake is not initiated until the gavel has been fairly encircled by the wire; and it is obvious that by keeping the rake at rest, as above described, it assists the wire, against which the grain is first pushed by the rake, in confining the grain till the gavel has been completely encircled in consequence of the descent of the binding-arm. The arm H of the binder is provided with a spool, $H^2$, carrying the wire. Said spool is mounted to rotate at the center of the arm, and provided with guides that direct the wire on leaving the spool parallel with the center of the arm. The wire, as it passes from the spool, passes through loops or eyes in the upper and outer sides of said arm, and around a roller inserted in the lower end of the arm.

The operation of my binding arrangement is as follows: The end of the wire from the spool $H^2$ is held between the clamp plates or jaws 2 and 3, and as the arm H is elevated it leaves the wire in a vertical position. The grain is then moved across the platform and against said wire by the rake T, which remains stationary and against the grain until the arm H is depressed into the casing of the twister, thus carrying the wire around the grain. The rake is then moved back across the platform in the manner heretofore described, the chain $h$ of sector X rotating shaft $g$ in proper direction to actuate the twisting-hook $A^3$, through the medium of pinion $i$ and $i^2$, wheel Y and $Y^2$ causing said hook to rotate, which brings the point of the hook between the wire and end of the arm, thus carrying the wire against cutter-blade $P^3$, whereby said wire is cut loose from the arm H. The hook $A^3$ makes several revolutions, thus firmly twisting the wire and binding the sheaf. The twister $A^3$ catches that part of the wire first held between the jaws 2 and 3, and also that part which is brought down by the descending arm H. These two parts of the wire being severed by the knife $P^3$ just at the under surface of the twister $A^3$, the under surface of which acts as a shear-blade of the twister $A^3$, and as the wire shortens in the act of twisting it ultimately frees itself from the twister by rising within and passing out of the fissure between the hook and body of the twister. The binding and twisted wire being thus released by the twisting device, enables the bound sheaf to fall onto the ground from the inside of the platform, it either being jarred off by the motion of the machine or pushed off by the succeeding gavel. The arm H does not rise until the wire is cut and twisted, said arm serving, in conjunction with sliding plate $L^4$, as before explained, to clamp the wire and prevent its slipping permanently from the twister after it is cut. When the arm H rises, the wire depending from its lower end is seized by the jaws 2 and 3 as soon as the latter are allowed to come together by the withdrawal of the wedge-like extremity of said arm. The wire is thus held ready for a repetition of the above operation.

$h^5$ (see Fig. 3) is a hollow rectangular stock, embracing and movable vertically in relation to the arm H. This stock carries at its upper end a roller or pin, $h^6$, which, by the action of a spring, $h^4$, on a lever, $H^4$, which carries said stock, is made to bear down upon the wire, and so retard its motion as it is paid out from the spool upon the binding-arm as the latter descends. Sufficient tension is thereby applied to the wire to enable the gavel to be firmly bound therewith. When the arm H ascends, the contact of the lever $H^4$ with the main frame of the machine serves to elevate the stock $h^5$ and roller $h^6$, thus relieving the wire of pressure and permitting it to be paid out freely as the lever rises.

The employment of two shafts, G $G^2$, in conjunction with the bearings of the arm H obviates the use of a spline, which, in the case of a single shaft, would be necessary, in order to impart vertical vibrations to the arm. The two shafts are preferable, for the reason that a spline would be subject to a wrenching and twisting action, calculated to seriously impair the same.

Having thus described my invention, what I claim as new, and desire to secure by Letters Patent, is—

1. The binding-arm H, capable of adjustment in the direction of the length of the grain, in combination with an automatic twisting device, substantially as and for the purposes described.

2. The shafts G $G^2$, in combination with the binding-arm H, substantially as and for the purposes set forth.

3. The arrangement of the cam-wheel J, forked lever I, pitman $f$, and lever $n$, for giving a vertical vibrating motion to the arm H, substantially as described.

4. The hooked twisting-wheel $A^3$, constructed and operated as described and represented, having an intermittent rotating motion, in combination with the stationary knife $P^3$, as and for the purpose explained.

5. The clamp plates or jaws 2 and 3, arranged and operating in combination with the arm H, substantially as and for the purpose set forth.

6. The slide-plate $L^4$, arranged and operating in combination with the arm H, substantially as and for the purpose set forth.

7. The combination of the shaft $g$, spring $g^2$, chain $h$, and sector X, for giving an intermittent motion to the twisting device $A^3$, substantially as described.

8. The combination of the reciprocating rake T, hinged weighted lever S, stop-pin $t^3$, and guide U, all arranged and operating substantially as described.

9. The employment of the jointed arms $t\,t^2$, stop-pin $t^3$, and hook $t^4$, or equivalent devices, in connection with the connecting-rods S $S^2$ $e$ $e^2$, whereby the rake is held at rest for a specific period every time it completes its motion toward the binder, substantially as and for the purpose explained.

10. The tension device, consisting of the arms $H^4$ $h^5$ $h^6$, and spring $h^4$, applied and operating substantially as and for the purpose explained.

11. The combination of crank-lever $e$, rod $e^2$, arm $t$, or its equivalent, slotted lever S, and pitman $S^2$, for the purpose of imparting a reciprocating motion to the rake, substantially as described.

JAMES F. GORDON.

Witnesses:
JACOB HENRY,
CHAS. D. SMITH.